July 9, 1929.  G. H. HAINES  1,720,360

MIXING APPARATUS

Filed April 25, 1928

INVENTOR
George H. Haines
By Archworth Martin
Attorney

Patented July 9, 1929.

1,720,360

UNITED STATES PATENT OFFICE.

GEORGE H. HAINES, OF CALEDONIA, OHIO, ASSIGNOR TO THE GRAIN MACHINERY COMPANY, OF MARION, OHIO, A CORPORATION OF OHIO.

MIXING APPARATUS.

Application filed April 25, 1928. Serial No. 272,738.

My invention relates to mixing apparatus, and is more particularly designed for employment in the mixing of feed for live stock, but it is susceptible also of use in the mixing of other materials.

One object of my invention is to provide apparatus that will more effectively mix material than various types of devices heretofore employed.

Another object of my invention is to provide a mixing apparatus and feed device therefor of improved form.

Still another object of my invention is to simplify and improve generally the structure and operation of mixing apparatus.

Figure 1:
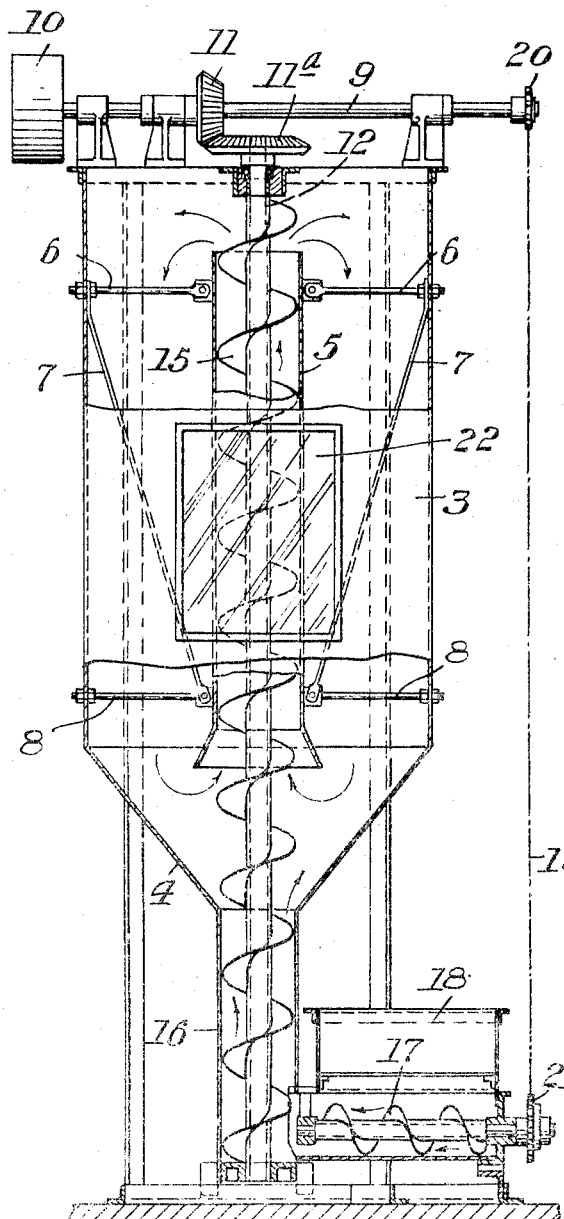
Figure 2:
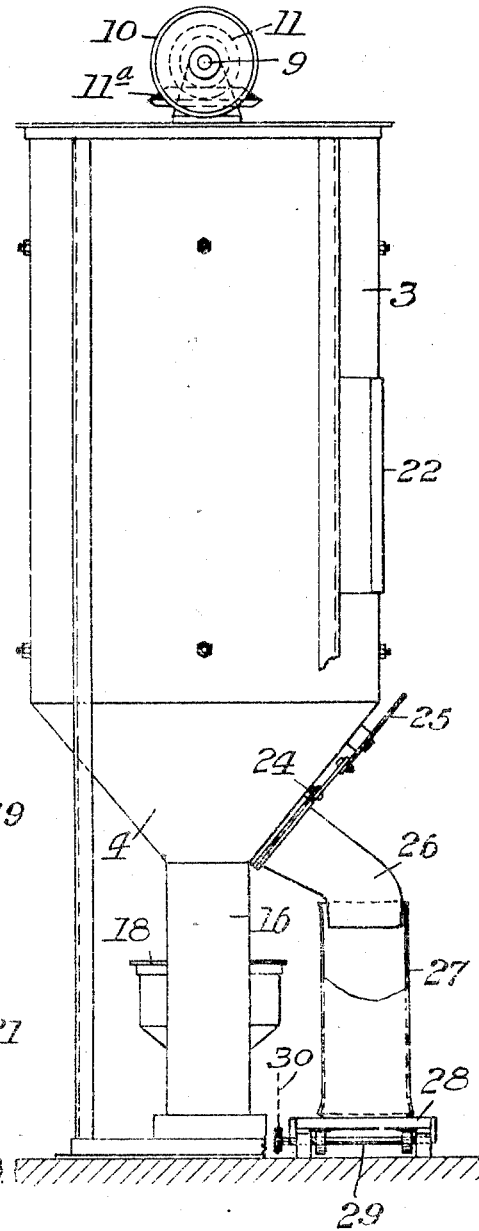

One form which my invention may take is shown in the accompanying drawing, wherein Figure 1 is a view of the apparatus, partially in elevation and partially in section, and Fig. 2 is an elevational view looking from the left hand side of Fig. 1.

The mixing chamber proper is designated by the numeral 3 and has a hopper-like bottom 4 of inverted cone shape. A cylinder 5 is supported centrally of the chamber 3 by means of brace rods 6, 7 and 8, whose outer ends are connected to the wall of the chamber, and whose inner ends are suitably joined to the cylinder 5. The cylinder 5 is open at both ends, its lower end being flared to permit the material to be more readily carried into and through the same.

A shaft 9 is mounted on the upper end of the mixing chamber and carries a pulley 10 which may be driven from any suitable source of power. The shaft 9 also carries a bevel pinion 11 which meshes with a gear wheel 11ª that is secured to the upper end of a shaft 12. The shaft 12 is provided with a vane 15 so that it will serve as a screw conveyor when rotated.

A cylindrical-like extension 16 is provided at the lower end of the hopper 4 and serves as a conduit through which material is advanced to the hopper. A screw conveyor 17 feeds material through the side of the cylinder 16 to the conveyor 15. The conveyor 17 is mounted beneath a hopper 18 into which material such as meal, bran, etc., or other material may be dumped. The conveyor 17 is driven by a chain 19 through sprockets 20 and 21. As the material is dumped into the hopper 18, it is advanced by the screw 17 to the screw conveyor 15 by which it is carried up to the hopper 4. When the hopper 4 becomes approximately filled, the conveyor 15 will carry the material upwardly through the conduit 5 and eject it from the upper end thereof. The ejected material will fall in the form of a spray in the mixing chamber 3 and eventually be again circulated through the cylinder 5. This repeated circulation serves to effectively mix the constituent portions of the material.

A glass covered window opening 22 is provided in the wall of the mixing chamber 3 so that the operator can determine when the material has been sufficiently mixed. During actual mixing of the material within the chamber 3, no additional material will ordinarily be supplied to the hopper 18.

Upon completion of a mixing operation, a gate or door 24 in the side of the hopper 4 will be opened by means of a lever 25 that is pivotally connected to the hopper and to the gate. Material will thereupon flow through a spout 26 into a bag or other receptacle 27. The receptacle 27 is shown as placed upon a platform 28 that is vibrated by cams mounted upon a shaft 29 which is driven, through a chain 30, from any suitable source of power, such as that from which the shaft 9 is driven. The vibration of the platform 28 serves to settle and compact the material in the receptacle.

The flared lower end or hood-like portion of the conduit 5 serves an important function in that it causes material to be advanced upwardly by the screw through the conduit 5 which material would otherwise simply be forced away from the screw in a generally radial direction, by centrifugal force or otherwise. It has been found that if the conduit 5 is of cylindrical form throughout, the material engaged by the screw 15 at points below the lower end of the conduit will simply be forced outwardly from the screw instead of being carried up into the conduit. The cone-like hood serves to catch the material which is forced radially outward and upwardly through rotation of the screw, and the material so caught will be held until it becomes packed or compacted sufficiently to be caught by the screw and carried up through the conduit, the material then being discharged from the upper end of the conduit as heretofore explained. The materials discharged from the upper end of the conduit eventually find their way down between the exterior edge of the flared opening of the conduit 15 and the hopper 4, and the stratification resulting through the introduction of various kinds of material into the mixing chamber is broken up, and the mixing of the material thereby facilitated.

I claim as my invention:—

1. Mixing apparatus comprising a mixing chamber of inverted conical form adjacent to its lower end, a conduit extending upwardly from a point adjacent to said lower end, the conduit being disposed centrally of said chamber and flared at its lower end, and a screw conveyor extending from said lower end upwardly into the conduit and operating to advance material upwardly through said conduit.

2. Mixing apparatus comprising a mixing chamber, a conduit of cylindrical form communicating with and extending downwardly from the lower end of said chamber, a second conduit disposed within said chamber, in axial alinement with, but spaced above the first-named conduit, a screw conveyor operating in said conduits and means for supplying material into the lower portion of the first-named conduit, a second-named conduit being flared at its lower end and disposed centrally of the chamber, to permit circulation of the material through vertical paths within said chamber.

3. Mixing apparatus comprising a mixing chamber, a vertically-disposed screw conveyor mounted therein, a conduit surrounding said conveyor, and means for actuating said conveyor to direct material upwardly through said conduit and over the upper edge thereof, the lower end of the conduit having a flared opening to permit re-entry of the material which is discharged from the upper end thereof, and the conveyor extending to a point below said lower end.

4. Mixing apparatus comprising a vertically-disposed conduit, which is flared at its lower end, and a screw conveyor operating in said conduit, and extending to a point below the lower end thereof, to advance materials therethrough.

5. Mixing apparatus comprising a mixing chamber of hopper form adjacent to its lower end, a conduit disposed in said chamber, and a screw conveyor disposed in said conduit, and extending to a point below the lower end thereof, the lower end of the conduit being flared and located within the said hopper portion of the chamber.

In testimony whereof I, the said GEORGE H. HAINES, have hereunto set my hand.

GEORGE H. HAINES.